United States Patent [19]
Morita et al.

[11] Patent Number: 5,375,117
[45] Date of Patent: Dec. 20, 1994

[54] MAINTENANCE COMMUNICATION CONTROL SYSTEM IN AN ISDN SERVICE

[75] Inventors: Sumie Morita, Yokohama; Takashi Hatano, Kawasaki; Ryouzi Takano, Yokohama; Hisashi Koga, Yokohama; Tsutomu Shiomitsu, Yokohama, all of Japan

[73] Assignee: Fujitsu Limited, Kawasaki, Japan

[21] Appl. No.: 141,582

[22] Filed: Oct. 27, 1993

Related U.S. Application Data

[63] Continuation of Ser. No. 810,051, Dec. 19, 1991, abandoned.

[30] Foreign Application Priority Data

Dec. 21, 1990 [JP] Japan .................. 2-405244

[51] Int. Cl.⁵ .................. H04J 3/12; H04J 3/16
[52] U.S. Cl. .................. 370/79; 370/94.1; 370/110.1
[58] Field of Search .................. 370/13, 14, 60, 60.1, 370/79, 94.1, 110.1, 111; 379/93, 94

[56] References Cited

U.S. PATENT DOCUMENTS

| | | | |
|---|---|---|---|
| 4,755,992 | 7/1988 | Albal | 370/110.1 |
| 4,930,123 | 5/1990 | Shimizu | 370/94.1 |
| 4,999,836 | 3/1991 | Fujiwara | 370/110.1 |
| 5,012,470 | 4/1991 | Shobu et al. | 370/110.1 |
| 5,042,029 | 8/1991 | Hayakawa | 370/60 |

Primary Examiner—Alpus H. Hsu
Attorney, Agent, or Firm—Staas & Halsey

[57] ABSTRACT

A maintenance link is established according to a LAPD between first and second terminal units on a path through which subscribers' packet information is transmitted. In the first and second terminal units, first and second communication state control units are provided for controlling the consistency of the communication state between the two terminal units by sending/receiving communication state control information using the maintenance link.

6 Claims, 5 Drawing Sheets

MAINTENANCE COMMUNICATION CONTROL SYSTEM IN AN ISDN SERVICE

This application is a continuation, of application Ser. No. 07/810,051, filed Dec. 19, 1991, now abandoned.

BACKGROUND OF THE INVENTION

1. Field of the Invention

The present invention relates to a communication control system for terminating call control information and packet information in an integrated service digital network (ISDN) after distributing the information to separate terminal unit. The present invention specifically relates to a maintenance communication control system in the ISDN service for establishing the consistency of the communication control state among terminal units being used.

2. Description of the Related Art

Recently, an integrated service digital network (ISDN) for providing various kinds of information over a digitally integrated communication network has been widely used. For example, in a basic interface of the ISDN, a user can communicate with correspondents using two information channels referred to as a B channel having a transmission speed of 64 kbits/s and one signal channel referred to as a D channel having a transmission speed of 16 kbits/s (this configuration is called "2B+D").

The B channel is used to transmit information communicated among users such as common telephone communication signals, facsimile signals, etc. The D channel is used for transmitting call control information (information about a call, a disconnection, etc.) and packet information.

The configuration of a terminal unit for terminating an ISDN service may possibly include a configuration in which all information in the above described B and D channels are terminated by one switching system.

Generally, however, line information through the B channel and the packet information through the D channel are processed in quite different manners.

Therefore, there arises a suggestion that the communication information through the above described two B channels and the call control information through the D channel are terminated by a common digital switching system (referred to as a main system). The packet information through the D channel is received by the above described digital switching system, and sent to a terminal unit used exclusively for packet information (referred to as a packet subsystem (PSS)), and then the information is terminated there. In this configuration, a workload of the communication network can be shared by two exclusive units. Accordingly, the structure of each. terminal unit can be simplified, and a conventional digital switching system can be used as a main system without large-scale addition or alteration.

In this case, the information in the D channel is transmitted in a procedure called a "link access protocol for D-channel (LAPD)" using a variable length signal frame based on a high level data link control procedure (HDLC). The HDLC is prescribed as an X.25 interface relating to a packet switching network recommended by the International Telegraph and Telephone Consultative Committee (CCITT). Additionally, the LAPD is a protocol in the layer 2 (the second layer) in the reference model of an open system interconnection (OSI), which is admitted by the CCITT. It contains an area called "an address field" and an area called "an information field."

The LAPD transmits the call control information and the packet information using the D channel in a basic interface as described above. A plurality of terminals can be accommodated in one basic interface using an in-house bus connection with a view to simultaneously perform communication at each terminal unit. To realize this function, the LAPD can establish a plurality of layer 2 links on a basic interface, thereby assuring the independence of information transmission in each link. This link access protocol is called "a multiplexed LAP".

In the LAPD, that is, a multiplexed LAP, a type of information transmission function such as the above described call control information and packet information, etc., is identified by address information called "a service access point identifier (SAPI)" stored in an address field of a frame. If SAPI=0, the frame stores call control information. If SAPI=16, it stores packet information. Likewise, address information called "a terminal endpoint identifier (TEI)" identifies one of a plurality of terminals accommodated in the same in-house system.

In the configuration of a load-sharing terminal comprising the above described main system and a PSS (packet subsystem), a basic interface is accommodated in a main system. In a digital subscriber circuit called "SPLC" in the main system, the SAPI of the D-channel frame is identified based on the above LAPD. Then, if SAPI=0 as described above, call control information is stored in the frame. Therefore, the frame is terminated by the main system, and then a call process is performed according to the information. On the other hand, if SAPI=16 as described above, packet information is stored in the frame. Therefore, the frame is transmitted from the main system to the PSS and terminated by a packet link controller called "PLCA" in the PSS, thus performing a switching operation.

However, in the configuration described above, communication control is made by distributing a workload to two terminals. Therefore, inconsistency arises in the communication control states between these two terminals, bringing a possibility that a malfunction or a fault may arise.

For example, if control is made such that a TEI is assigned by the SPLC of the main system but not on the side of the PSS with a view to enabling the establishment of a logical link for each terminal on one basic interface described above, and unless control is made for consistency of the TEI assignment between the main system and the PSS; there is a possibility that an abnormal condition arises where the PSS establishes a link, etc. when a packet terminal that is not assigned a TEI issues a TEI illegally and packet information is given as SAPI=16.

On the other hand, the control of a layer 1, that is, the electric control of a physical line, in a basic interface is performed by a digital subscriber circuit, that is, the SPLC, to which the interface is connected directly. With a view to saving electric power consumption, the subscriber circuit common unit SPLC turns the physical line to the inactive state where a signal is not sent electrically when no links are established on the physical line in the basic interface. The SPLC turns the physical line to the active state when an establishment request for at least one link is issued. Therefore, when no control is performed on the consistency of the communication control state between the main system and the PSS, the SPLC erroneously determines that all the links are terminated in the basic interface, and possibly deactivates and disconnects the physical line although a packet information link has not been terminated in the PSS.

To prevent the above described inconsistency of the communication control state, control must be performed on the consistency of the communication control state between the main system and the PSS. In the prior art technology, there are no communication control systems which efficiently control for the consistency of the communication control state without charging an excess workload to the main system and the PSS.

SUMMARY OF THE INVENTION

The present invention has been developed based on the above described background, and aims at enabling efficient control of a communication state without charging an excess workload to a main system and a packet subsystem.

The present invention relates to a communication control system for terminating subscribers' call control information and packet information transmitted using a D channel of an integrated service digital network after distributing the information to first and second terminal units.

First, in the present invention, a maintenance link is established between the first and second terminal units.

Next, the present invention includes, in the first and second terminal units, first and second communication state controllers for controlling the consistency of the communication state between the two terminal units by receiving communication state control information through a maintenance link.

With the present invention in the above described configuration, such controlling operations can be conducted between the first and the second terminal units for controlling the consistency of a terminal endpoint identifier, for controlling the consistency of the control of the layer 1 in a subscriber line, and for monitoring a congestion state in relay units of a packet link of each subscriber. These controlling operations enable perfect distribution of a workload to two exclusive terminal units.

Especially, establishing a maintenance link using the same protocol as a link access protocol (LAPD) for a D channel in a basic interface eliminates the problem of developing a new program for controlling the maintenance link, thus enabling an efficient system development and a reduction of a workload to both the first and second terminal units during the operation.

BRIEF DESCRIPTION OF THE DRAWINGS

Objects and features of the present invention can be easily recognized in the explanation of the principle and a preferred embodiment of the present invention in association with the attached drawings.

DESCRIPTION OF THE PREFERRED EMBODIMENTS

Figure 1:
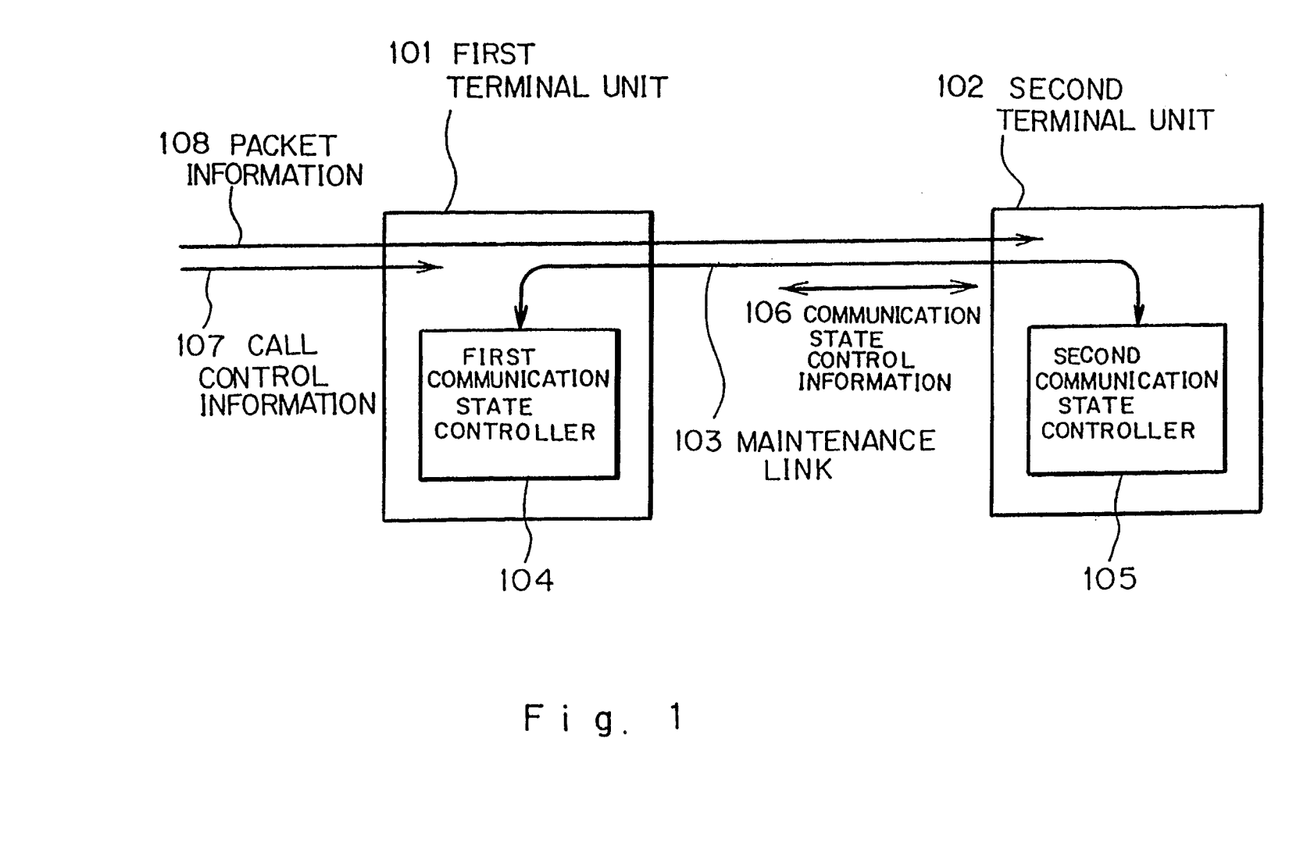
FIG. 1 is a block diagram for explaining the present invention.

FIG. 1 is a block diagram for explaining the principle of the present invention. The present invention relates to a communication control system for terminating subscribers' call control information 107 and packet information 108 transmitted using a D channel of an integrated service digital network (ISDN) after distributing the information to a first terminal unit 101 such as a main system, etc. and a second terminal unit 102 such as a packet subsystem, etc.

First, the maintenance link 103 is established between the first terminal unit 101 and the second terminal unit 102. The maintenance link 103 is established, based on a multiplexed link access protocol, between the first terminal unit 101 and the second terminal unit 102, for example, on the path through which the subscribers' packet information 108 is transmitted (an intra-station path, etc.). Then, the multiplexed link access protocol is, for example, a link access protocol for D channel (LAPD) in the basic interface. The above described maintenance link 103 can be established by setting, in the above described multiplexed link access protocol, a value of a service access point identifier (SAPI) to a predetermined value other than a value for indicating the transmission of subscribers' call control or packet information, for example, SAPI=63.

Next, first and second communication state controllers 104 and 105, respectively, are provided in the first and second terminal units 101 and 102, respectively. These controllers ensure the consistency of the communication state between the two terminal units by sending/receiving communication state control information using the maintenance link 103. They perform such controlling operations as ensuring the consistency of a terminal endpoint identifier in a line link using a B channel and a packet link using a D channel, and ensuring the consistency of the control of the layer 1 in a subscriber line.

In the above described principle configuration, the second communication state controller 105 inquires whether or not a predetermined terminal endpoint identifier can be assigned to the first communication state controller 104 when an establishment request for a packet link is issued by a subscriber together with the predetermined terminal endpoint identifier. If yes, the packet link is established.

The consistency of the terminal endpoint identifier can be ensured between the first and the second terminal units 101 and 102 according to the above described inquiry.

When the first terminal unit 101 controls the layer 1 for electrically activating/deactivating a subscriber line, the second communication state controller 105 notifies the first communication state controller 104 of the number of packet links established at present. The notification enables a perfect control of the layer 1 based on the number of line links of the B channels and the number of the packet links presently established.

In this case, especially, establishing a maintenance link 103 using the same protocol as a D-channel link access protocol (LAPD) in a basic interface eliminates the trouble of developing a new program for controlling the maintenance link 103, thus enabling an efficient system development and a reduction of a workload to both the first and second terminal units 101 and 102 during the operation.

A preferred embodiment of the present invention is explained in association with the attached drawings.

Figure 2:
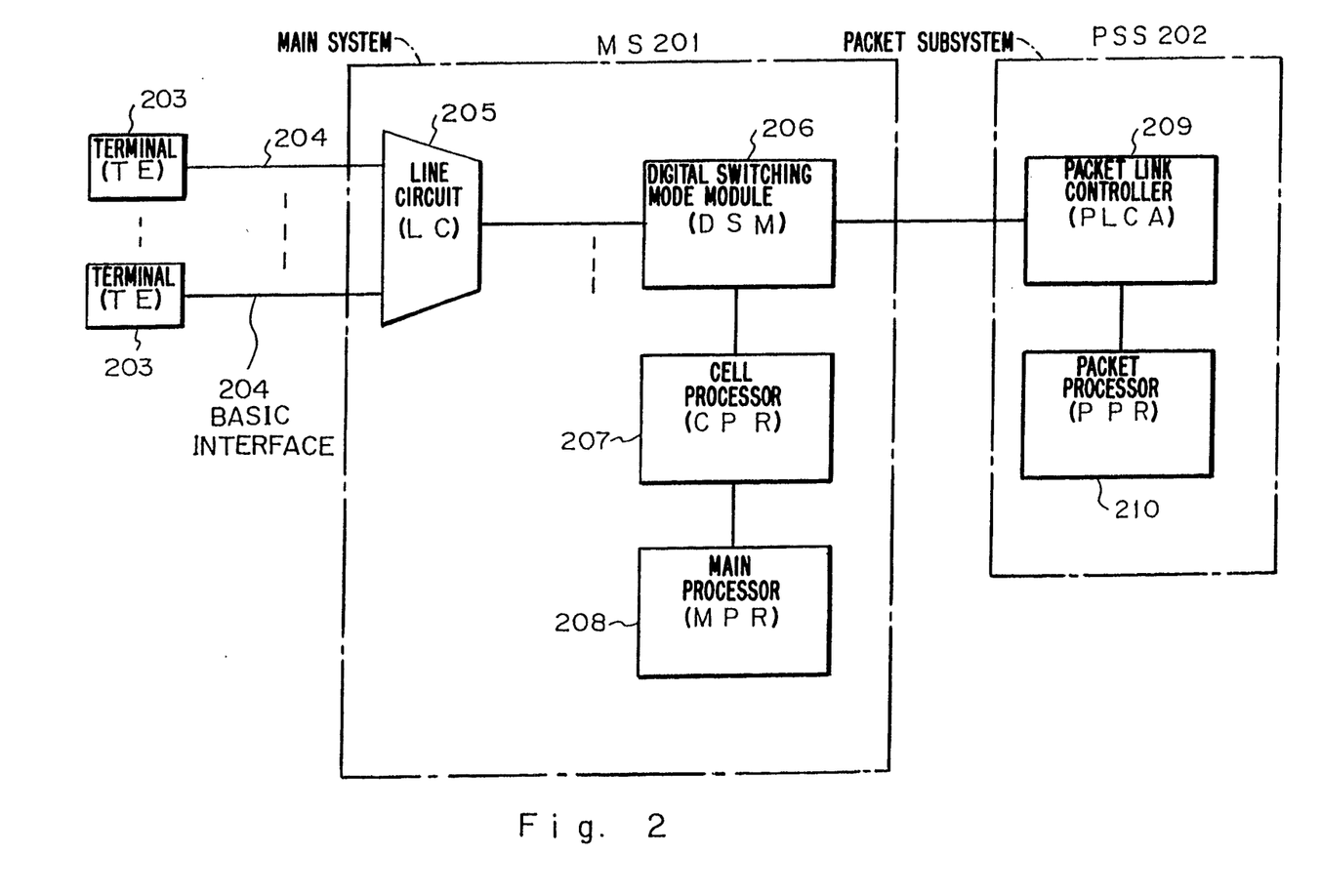
FIG. 2 is a block diagram of a preferred embodiment according to the present invention.

FIG. 2 shows a total configuration of a preferred embodiment of the present invention. The embodiment comprises a main system (MS) 201, that is, a main body of a digital switching unit, and a packet subsystem (PSS). The main system 201 accommodates a plurality of terminals (TE) 203 connected through a basic interface 204 having a 2B+D configuration, and terminates the communication information in a B channel and the call control information in a D channel. The PSS is connected to the MS 201 and terminates the packet information in the D channel transmitted from the TE 203 through the MS 201.

The MS 201 comprises a line circuit (LC) 205 for directly terminating a plurality of the TE 203, multiplexing them to intra-station highways, and retrieving the call control information in the D channel from each TE 203; a digital switching module (DSM) 206 for switching highways; a call processor (CPR) 207 for performing a call control on the DSM 206 according to the call control information of the LC 205; and a main processor (MPR) 208 for having control on the whole switching system and control of the communication to and from other stations.

A PSS 202 comprises a packet link controller (PLCA) 209 for, for example, terminating packet information and a packet processor (PPR) 210 for switching packet information.

Figure 3:
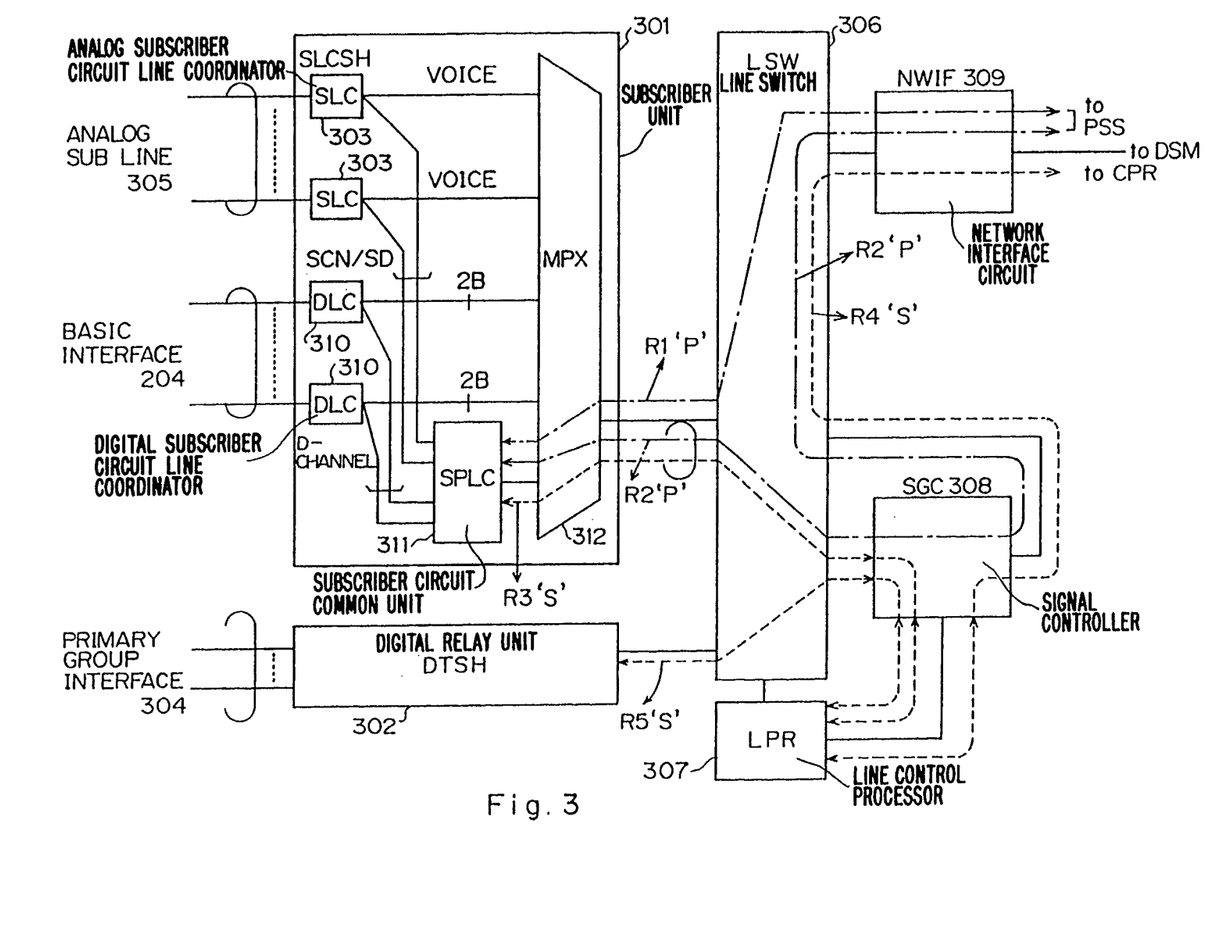
FIG. 3 is a block diagram of a link controller LC.

Next, FIG. 3 shows a block diagram of the LC205.

A subscriber unit SLCSH 301 is the most important unit in the present invention, and terminates a basic interface 204 shown in FIG. 1. The SLCSH 301 also terminates an analog sub line 305, and a digital relay unit (DTSH) 302 terminates a primary-rate interface 304 in the ISDN.

A line switch (LSW) 306 performs a switching operation by connecting each input/output information associated with the SLCSH 301, and DTSH 302 to a signal controller SGC 308 described later, and to a plurality of the input/output highways (not shown in FIG. 2) accommodated in the DSM 206 shown in FIG. 2 through a network interface circuit (NWIF) 309.

A signal controller (SGC) 308 concentrates lines and relays a D-channel signal.

A line control processor (LPR) 307 sends/receives call control information in the D channel through the SGC 308 and controls each switch of the LSW 306.

The SLCSH 301 is specifically important to the present invention and comprises a digital subscriber circuit line coordinator (DLC) 310 for terminating each basic interface 204 and demultiplexing two B channels from one D channel; an analog subscriber circuit line coordinator (SLC) 303 for terminating the analog subline 305 and processing a call control signal; a subscriber circuit common unit (SPLC) 311 for processing a D-channel controlled by each DLC 310 and a scanning/distributing signal (SCN/SD), that is, a call control signal controlled by each SLC 303 and a multiplexing circuit (MPX) 312 for multiplexing or demultiplexing the input/output of each of the two B channels corresponding to each DLC 310, a voice signal corresponding to each SLC 303, and the input/output of the SPLC 311.

Figure 4:
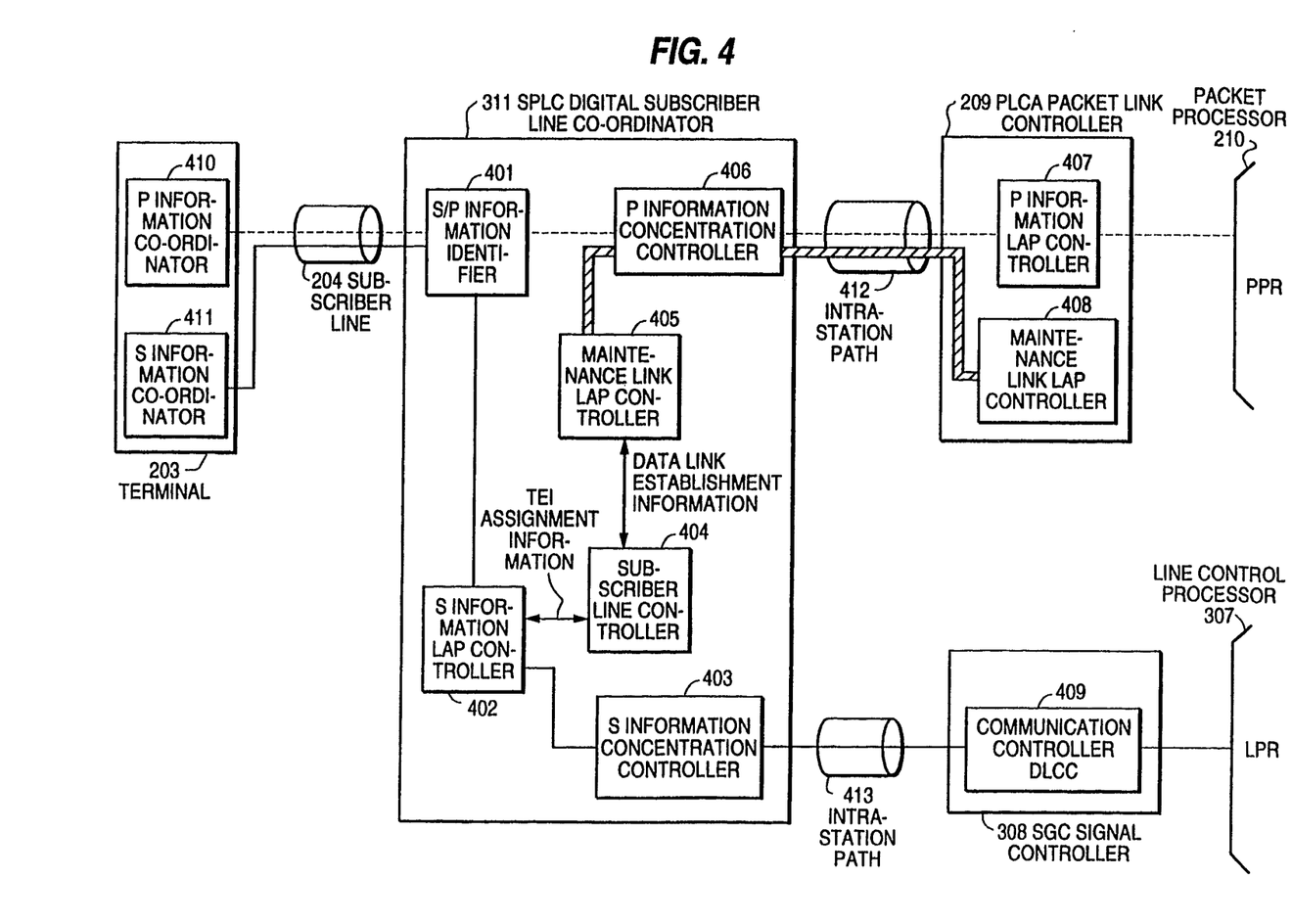
FIG. 4 is a block diagram of a digital subscriber circuit SPLC, a Packet link controller PLCA, a signal controller SGC, and a terminal TE.

FIG. 4 is a block diagram for explaining the most important units SPLC 311, PLCA 209, SGC 308, and TE 203 of the present invention extracted from the configuration of this embodiment shown in FIGS. 2 and 3.

First, an S/P information identifying unit 401 in the SPLC 311 identifies call control information (referred to as S information) in the D channel transmitted from an S information coordinator 411 in the TE 203 through the subscriber line (basic interface) 204 and the DLC 310 (refer to FIG. 3) as shown by a solid line shown in FIG. 4, and also identifies packet information (referred to as P information) in the D channel transmitted from a P information coordinator 410 as shown by a broken line shown in FIG. 4. The P information is transmitted to a P information concentration controller 406 in the SPLC 311, and the S information is transmitted to an S information LAP controller 402. The S/P information identifying unit 401 also transmits the above described information in the reverse route.

The S information LAP controller 402 in the SPLC 311 terminates the S information according to the LAPD protocol to control an automatic assignment of a terminal endpoint identifier to each TE 203. In this case, the TEI assignment information is sent/received to and from a subscriber line controller 404 in the SPLC 311. The S information is sent/received to and from the LPR 307 through an S information concentration controller 403 in the SPLC 311, an intra-station path 413, and an SPLC communication controller 409 in the SGC 308.

The subscriber line controller 404 is a unique component of this embodiment and sends/receives the TEI assignment information to and from the S information LAP controller 402 according to the communication state control information sent/received to and from the PLCA 209 through a maintenance link described later with a view to performing a control of the consistency, such as confirmation of the TEI assignment, in the communication state between the SPLC 311 and the PLCA 209 (in the PSS 202 shown in FIG. 2).

On the other hand, the P information received from a plurality of TE 203 by the S/P information identifying unit 401 in the SPLC 311 is outputted by the P information concentration controller 406 to an intra-station path 412 leading to the PLCA 209 (refer to FIG. 2) in the PSS 202. The P information is terminated in a P information LAP controller 407 in the PLCA 209 according to the LAPD protocol. Thus, the P information terminated by the P information LAP controller 407 is sent to the PPR 210 (refer to FIG. 2) for processing the information in a packet switching process. The P information can also be transmitted in the reverse route.

As a unique component in this embodiment, a maintenance link is established in the intra-station path 412 through which the P information between the SPLC 311 and the PLCA 209 is transmitted. Using this maintenance link, the communication state control information for ensuring the consistency of the communication control state is transmitted between the SPLC 311 and the PLCA 209 (in the PSS 202 (refer to FIG. 2)). The maintenance link LAP controller 405 in the SPLC 311 and a maintenance link LAP controller 408 in the PLCA 209 terminate the above described communication state control information according to the LAPD protocol similar to the S or P information communication protocol in the basic interface.

A maintenance link lap controller 405 in the SPLC 311 is connected to the subscriber line controller 404, and the maintenance link LAP controller 408 in the PLCA 209 is connected to the PPR 210.

The operations of this embodiment in the configuration as shown in FIGS. 2-4 are explained as follows.

First, prior to the explanation about "a maintenance link", which is the most important component in the present invention, a total flow of the S and P information in a basic interface is described in association with FIG. 3.

The P information (packet information) received from the TE 203 through the basic interface 204 and the DLC 310 in the SLCSH 301 is outputted by the MPX 312 as indicated by an intra-station path R1 "P" shown in FIG. 3, processed by the LSW 306 during the switching operation, and then sent to the PSS 202 (refer to FIG. 2) through the NWIF 309. The intra-station path R1 "P" is used in a large-scale ISDN network and three units are arranged in parallel. The above described P information is outputted from the MPX 312 as indicated by an intra-station path R2 "P" shown in FIG. 3, switched by the LSW 306 to be applied to the SGC 308 in which the information is concentrated and relayed to be switched again by the LSW 306, and then sent to the PSS 202 through the NWIF 309. The intra-station path R2 "P" passing through the SGC 308 is used in a small-scale ISDN network. It concentrates and relays the P information corresponding to a plurality of terminals. The P information can also be transmitted in the reverse direction.

In contrast, the S information (call control information) received from the TE 203 through the basic interface 204 and the DLC 310 in the SLCSH 301 is outputted by the MPX 312 as indicated by an intra-station path R3 S shown in FIG. 3, switched by the LSW 306 to be applied to the SGC 308, and then sent to the LPR 307. The S information can be transmitted in the reverse direction.

The S information (call control information) received from the primary rate interface 304 through the DTSH 302, which is not specifically related to the present invention, is switched by the LSW 306 and applied to the SGC 308 after being outputted by the DTSH 302 as shown by the intra-station path R5 "S" in FIG. 3, and then sent to the LPR 307. The S information can be transmitted in the reverse direction.

The S information outputted from the LPR 307 to the CPR 207 (refer to FIG. 2) is outputted by the LPR 307 to the SGC 308 as indicated by an intra-station path R4 shown in FIG. 3, switched by the LSW 306, and then sent from the DSM 206 to the CPR 207 (refer to FIG. 2) through the NWIF 309. The S information can also be transmitted in the reverse direction.

In this embodiment, a maintenance link is provided on the intra-station path R1 for transmitting the P information shown in FIG. 3 according to a LAPD, that is, a multiplexed LAP. Using this maintenance link, communication state control information is sent/received between the SPLC 311 and the PLCA 209. In this case, the intra-station path 412 corresponds to the intra-station path R1 shown in FIG. 3. The above described maintenance link can also provided on the intra-station path R2 for transmitting the P information through the SGC 308 shown in FIG. 3.

A maintenance link provided on the intra-station path 412 as indicated conceptionally by diagonal lines in FIG. 4 is terminated by the maintenance link LAP controller 405 in the SPLC 311 and the maintenance link LAP controller 408 in the PLCA 209. In this case, a link is terminated according to a LAPD protocol similar to the S or P information communication protocol in the basic interface. A value of the SAPI=63, for example, is assigned to the maintenance link.

Thus, using the LAPD protocol as is eliminates the necessity of developing a new program for controlling the maintenance, thus enabling efficient system development. Additionally, it reduces a workload on the MS3 201 and the PSS 202 during operation.

Furthermore, establishing a maintenance link according to the LAPD, that is, a multiplexed LAP, on the intra-station path 412 on which a P information link is established enables the following controlling operations as control functions using a maintenance link. The communication state between the SPLC 311 and the PLCA 209 can be controlled, and the intra-station path 412 can be monitored when a P information link is established.

Figure 5:
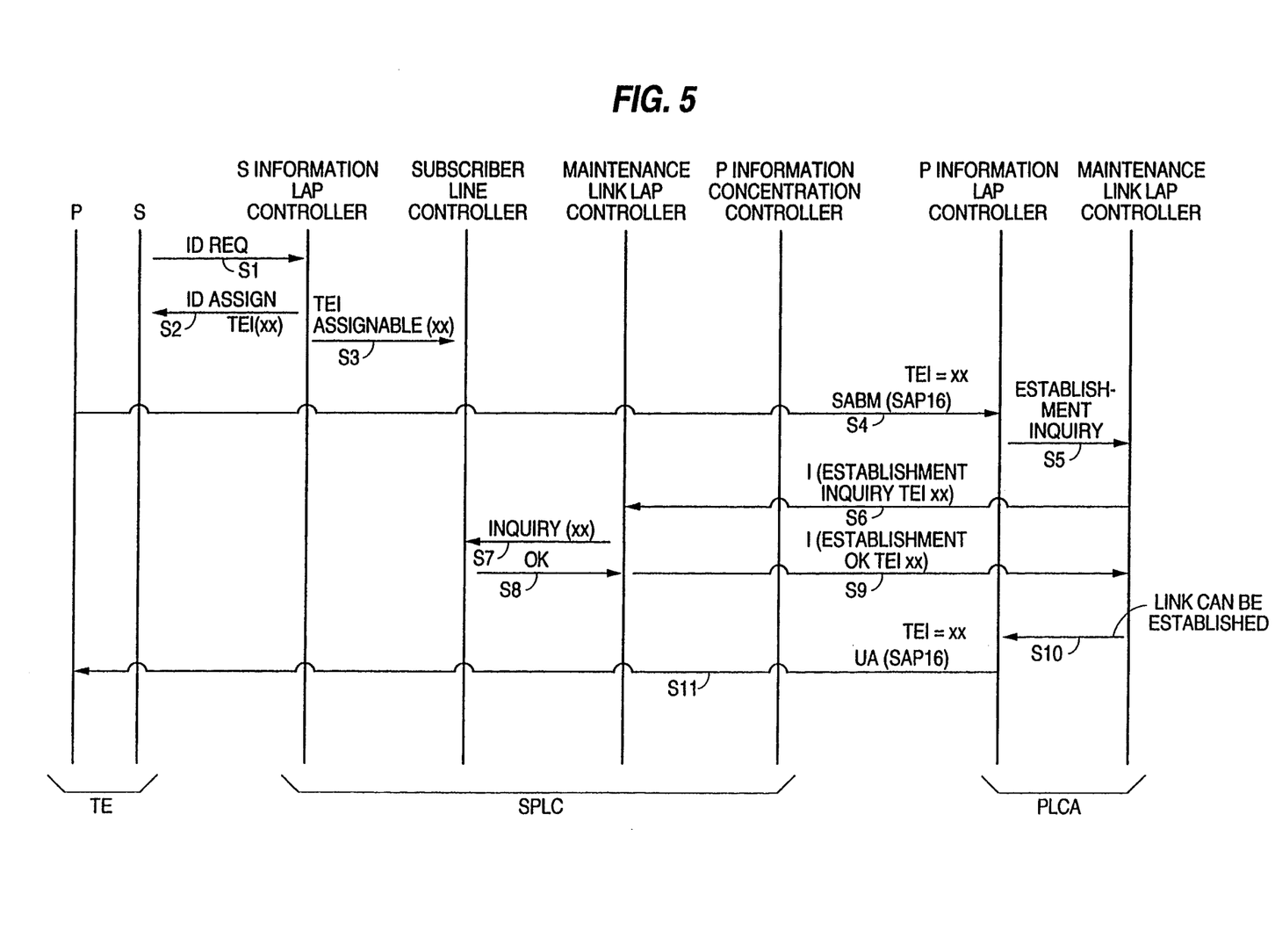
FIG. 5 is a block diagram for explaining the sequence for establishing a packet multiplexed link.

Relating to a TEI management process performed by the subscriber line controller 404 in the SPLC 311 shown in FIG. 4 using a communication function with communication state control information in the above described maintenance link, a sample sequence of establishing a packet multiplexed link shown in FIG. 5 is explained as follows.

Up to eight units of TE 203 can be connected to a basic interface through an in-house bus connection. Therefore, a TEI must be assigned to each TE 203 as described in "The Description of the Related Art" with a view to establishing a point-to-point link under a LAPD, that is, a multiplexed LAP.

For example, when the TE 203 is connected to a socket in an in-house bus, an assignment request for a TEI (ID REQ) is issued from the S information coordinator 203 of the TE 203 to the S information LAP controller 402 of the SPLC 311 (refer to S1 in FIG. 5).

The S information LAP controller 402 allots an unused TEI (selects one of eight values: XX) in the basic interface to which the TE 203 is connected, and returns TEI assignment information (ID ASSIGN) to the TE 203 (refer to S2 in FIG. 5). Simultaneously, the S information LAP controller 402 notifies the subscriber line controller 404 of the TEI assignment information that a link can be established with the given TEI.

Afterwards, when an SABM command, that is, a request command for setting an asynchronous balanced mode, is sent by the information coordinator 410 of the same TE 203 together with the TEI assigned to the terminal as the P information for establishing a packet link (assigned SAPI=16), the P information is applied to the P information LAP controller 407 in the PLCA 209 through the S/P information identifying unit 401, the P information concentration controller 406 in the SPLC 311, and the intra-station path 412 (refer to S4 in FIG. 5).

On the other hand, the P information LAP controller 407 instructs the maintenance link LAP controller 408 to inquire of the SPLC 311 whether or not a packet link can be established in response to the above described SABM command (refer to S5 in FIG. 5).

In response to this instruction, the maintenance link LAP controller 408 inquires of the SPLC 311 as communication state control information using an I frame of the HDLC through the intra-station path 412 whether or not a packet link can be established using a TEI added to the above described SABM command (refer to S6 in FIG. 5). "SAPI=16" is added to the communication procedure according to the LAPD. In this case, a correct transmission of communication state control information through the intra-station path 412 can be ensured since an I frame of the sequentially numbered HDLC is used.

The above inquiry information is received by the maintenance link LAP controller 405 and then sent to the subscriber line controller 404 (S7 in FIG. 5).

The subscriber line controller 404 determines whether or not the TEI in the enquiry above can really be assigned. In an example shown in FIG. 5, the above described TEI is correctly assigned (refer to S2). Therefore, a notification that a packet link can be established is returned to the maintenance link LAP controller 405 (refer to S8 in FIG. 5).

This notification is transmitted as communication state control information using an I frame of the HDLC from the maintenance link LAP controller 405 to the PLCA 209 through the intra-station path 412 (refer to S9 in FIG. 5). The communication procedure is assigned SAPI=16 again according to the LAPD.

The above notification is received by the maintenance link LAP controller 408, and then applied to the P information LAP controller 407 (refer to S10 in FIG. 5). The P information LAP controller 407 sends a notification, as a UA response (acknowledgment in response to a no-number command) of the HDLC contained in the P information which is assigned SAPI=16, informing that a packet link can be established with the requested TEI (refer to S11 in FIG. 5). The response is received by the P information coordinator 410 of the TE 203. As a result, a packet link can be established between the TE 203 and the PSS 202.

When the subscriber line controller 404 determines that the TEI in the inquiry cannot be assigned, the PLCA 209 is notified of it, and a DM response indicating a disconnection is output from the P information LAP controller 407 to the TE 203. Thus, a packet link is not established.

As described in the above operation, the present invention enables the consistent TEI management between the SPLC 311 and the PLCA 209.

Next, a layer-1-control-information management, which can be realized by the subscriber line controller 404 in the SPLC 311 using the above described TEI management function, is described as follows:

The SPLC 311 controls a layer 1 for activating/deactivating a basic interface as described in "The Description of the Related Art." The SPLC 311 must manage not only the number of line information links using the currently established B channel but also the number of packet information links using the currently established D channel in the PSS 202 (refer to FIG. 2). In this embodiment, this management can be performed by the subscriber line controller 404.

That is, when the PPR 210 releases a packet link, the PLCA 209 notifies the SPLC 311 from the maintenance link LAP controller 408 through the intra-station path 412 of the communication state control information with the TEI which has been assigned to the above described released link.

The information is received by the maintenance link LAP controller 405 in the SPLC 311 link, and then applied to the subscriber line controller 404. The subscriber line controller 404 can manage not only the number of currently established line information link but also the number of the currently established packet information links. Thus, the subscriber line controller 404 activates, as layer-1 control, the physical line of the basic interface when an establishment request for a link of either the first line information or the packet information on the basic interface is issued. The subscriber line controller 404 deactivates the physical line when all the links of the line information and the packet information are released.

In the above described embodiment, the TEI management and the layer-1-control-information management can be conducted consistently between the SPLC 311 and the PLCA 209 by transmitting the communication state control information between the SPLC 311 and the PLCA 209 using a maintenance link. However, it is obvious that the present invention is not limited to the above described configuration. With the increasing demand of ISDN services, a congestion control for each subscriber can be also realized by notifying an SPLC or a PLCA of the congestion information of each relay unit of the packet information using a maintenance link.

What is claimed is:

1. A maintenance communication control system in integrated service digital network, ISDN, services for terminating subscriber's call control information and packet information transmitted using a D channel of an ISDN after being distributed separately to a first terminal unit and a second terminal unit, comprising:

said first terminal unit for terminating the subscriber's call control information;

said second terminal unit for terminating the subscriber's packet information;

a maintenance link provided between said first and second terminal units; and first and second communication state control means for controlling the consistency of the communication state between said first and second terminal units by sending/receiving information on terminal end point identifiers of a line link using a B channel and a packet link using said D channel, using said maintenance link, said first and second communication state control means respectively provided in said first and second terminal units.

2. A maintenance communication control system in ISDN services according to claim 1, wherein said maintenance link is established according to a multiplexed link access protocol through which said subscriber's packet information is transmitted between said first and second terminal units.

3. A maintenance communication control system in ISDN services according to claim 2, wherein said multiplexed link access protocol is a link access protocol for D channel in a basic interface;

said maintenance link can be established if said multiplexed link access protocol sets a value of a service access point identifier to a predetermined value other than a value indicating a subscriber's call control information transmission and a value indicating a subscriber's packet information transmission.

4. A maintenance communication control system in ISDN services according to claim 1, wherein said first and second communication state control means control the consistency of a layer-1-control of a subscriber line.

5. A maintenance communication control system in ISDN services according to claim 4, wherein said first and second communication state control means control the consistency of said layer-1-control of a subscriber line by managing the number of line links using the currently established B channel and the number of packet links using the currently established D channel.

6. A maintenance communication control system in ISDN services according to claim 5, wherein
said first and second communication state control means control the consistency of said layer-1-control of a subscriber line such that a physical line of a basic interface is activated when a first established request for a line link or a packet link is issued to said basic interface, and is deactivated when all said line links and said packet links are released.

* * * * *

UNITED STATES PATENT AND TRADEMARK OFFICE
CERTIFICATE OF CORRECTION

PATENT NO. : 5,375,117
DATED : December 20, 1994
INVENTOR(S) : Sumie Morita et al.

It is certified that error appears in the above-identified patent and that said Letters Patent is hereby corrected as shown below:

Col. 1, line 14, change "unit" to --units--; and
line 55, change "each." to --each--.

Col. 2, line 62, delete "subscriber circuit common unit".

Col. 3, line 12, delete "for";
line 40, delete "the" (second occurrence);
line 66, delete "digital"; and
line 67, before "SPLC" insert --common unit--, and change "Packet" to --packet--.

Col. 4, line 13, after "and" insert --to--.

Col. 7, line 32, change "S" to --"S"--; and
line 59, after "also" insert --be--.

Col. 10, line 23, after "ISDN" insert --,--.

Signed and Sealed this

Second Day of May, 1995

Attest:

BRUCE LEHMAN

*Attesting Officer*       *Commissioner of Patents and Trademarks*